Sept. 6, 1955  A. GREENBAUM  2,717,365
ELECTRICAL OUTLET RECEPTACLE HAVING INSULATION
PIERCING MEANS FOR AN ELECTRICAL CORD
Filed Nov. 13, 1951  2 Sheets—Sheet 1

INVENTOR.
ARTHUR GREENBAUM
BY
James C. Ledbetter
ATTORNEY

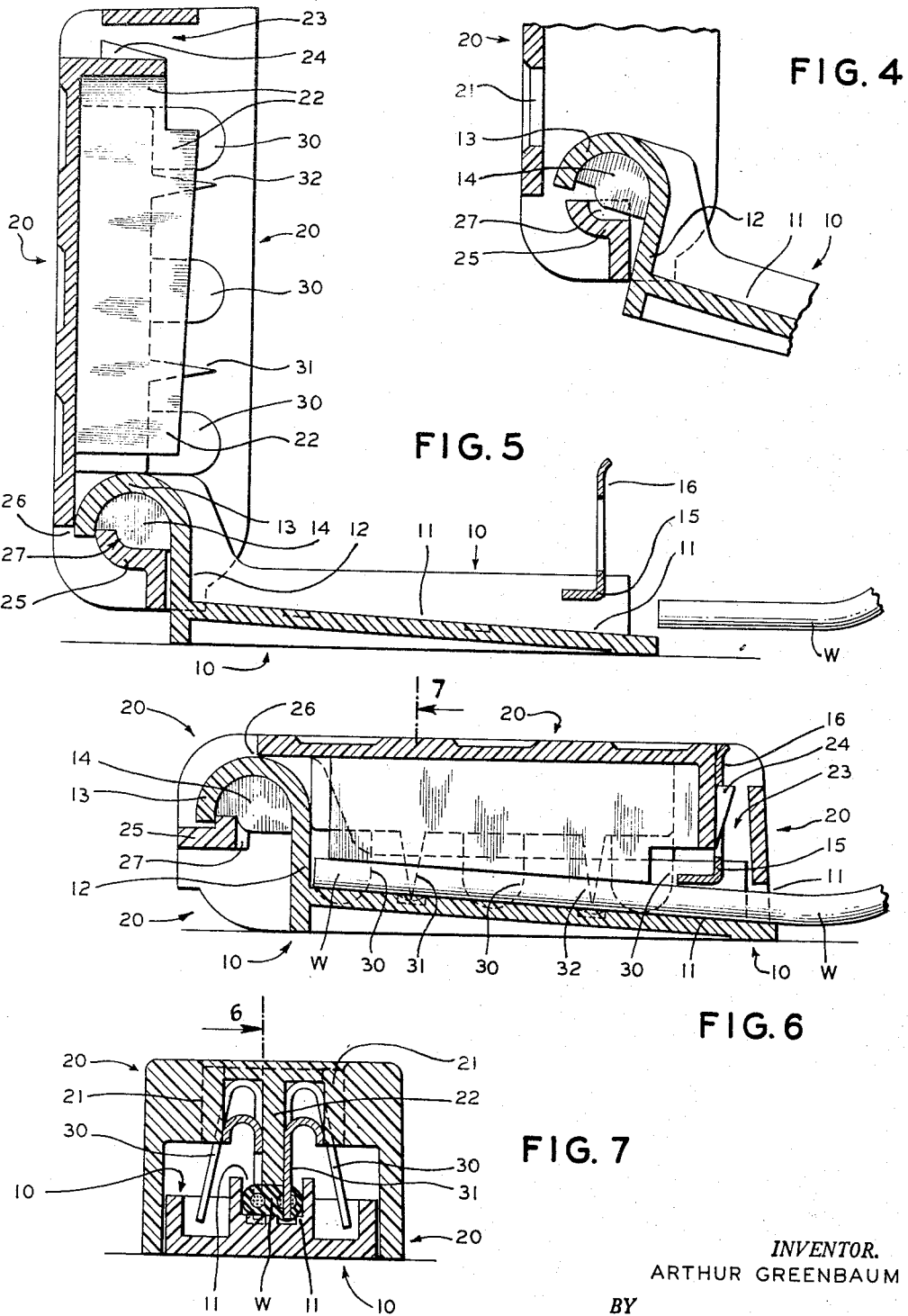

United States Patent Office 2,717,365
Patented Sept. 6, 1955

2,717,365

ELECTRICAL OUTLET RECEPTACLE HAVING INSULATION PIERCING MEANS FOR AN ELECTRICAL CORD

Arthur Greenbaum, Tuckahoe, N. Y., assignor to Academy Electrical Products Corp., New York, N. Y., a corporation of New York Application November 13, 1951, Serial No. 255,987

11 Claims. (Cl. 339—99)

This invention relates to an electrical outlet receptacle having insulation piercing means for an electrical cord having a new mode of making a permanent connection with a conductor and is for use with conventional two-wire cord plug terminals adapted for quick-connect and disconnect contact therewith in the usual manner.

The novel features herein comprise means for automatically installing, i. e., attaching this electrical receptacle to an ordinary two-wire flat cord conductor, by which to establish an insulation-pierced permanent electrical connection and a strain-relief grip therewith. Incidentally, the contact elements or spring fingers per se, of this new receptacle, are conventional in form for releasable contact engagement with the wellknown disconnect contact blades of cord plugs.

Main purposes of the invention are to produce an insulation-piercing type of electrical outlet receptacle which automatically (without the use of a tool) establishes a permanent electrical connection with a conventional flat two-wire conductor without deinsulating it, as well as simultaneously effecting a strain-relief grip thereon, when installing the receptacle for use on said conductor, and which requires a minimum amount of material and parts for its manufacture.

This specification with its claimed subject matter and accompanying drawings explains the invention as preferred and embodied at this time for an understanding of the problems sought to be solved. Since the teachings herein may suggest structural changes to others who wish to avail themselves of the benefits of the invention, it is pointed out that subsequent modifications hereof may well be the same in spirit and principle as this disclosure.

The drawings herein have been made from a production or commercial specimen of the receptacle and are laid out more especially to emphasize those features which make it automatic, quick, and convenient, when permanently connecting it with the end of the above named conductor. Accordingly, the illustrated example herein follows the receptacle construction in principle, as produced for the trade, but does not involve details unnecessary to this disclosure.

This electrical receptacle appears new in the art by reason of its particular structural combination of features. It is characterized by a convenience which increases utility and readily fills a need for an outlet connection capable of quick installation by one inexperienced with household and other like conventional circuit wiring. These particulars are more fully understood by reference to the drawings and also by examining the device available in the trade.

As the drawings show, this new receptacle consists of five parts organized into the aforementioned new combination. Two of the parts are non-conductive housing members of molded plastic, one comprising a base or bottom member of comparatively thin and flat form, and the other being a hollow cover or top member with deep sides having an open bottom which embraces and encloses the base. These two molded members are uniquely hinge-assembled for a pivotal action (at their inner or rear ends) to give a wide opening and closing motion (at their outer or front ends) thus providing the automatic quick-installation utility first mentioned.

The next two parts are electrically conductive and hence metallic, being duplicate or twin portions, which are die-stamped with resilient contact fingers and with rigid piercing barbs, all integral on a common stringer of elongate form; and these two parts contribute to the unique hinge-assembly previously mentioned. The fifth part comprises a spring latch to lock the cover down in finally closed position onto the base, with the electrical conductor (a two-wire cord) disposed in service position between said cover and base.

Fig. 1 is made actual size but Fig. 2 and the views following it are approximately twice size of a commercial specimen, as thus scaled on the official original-size Patent Office drawings.

Figure 1:
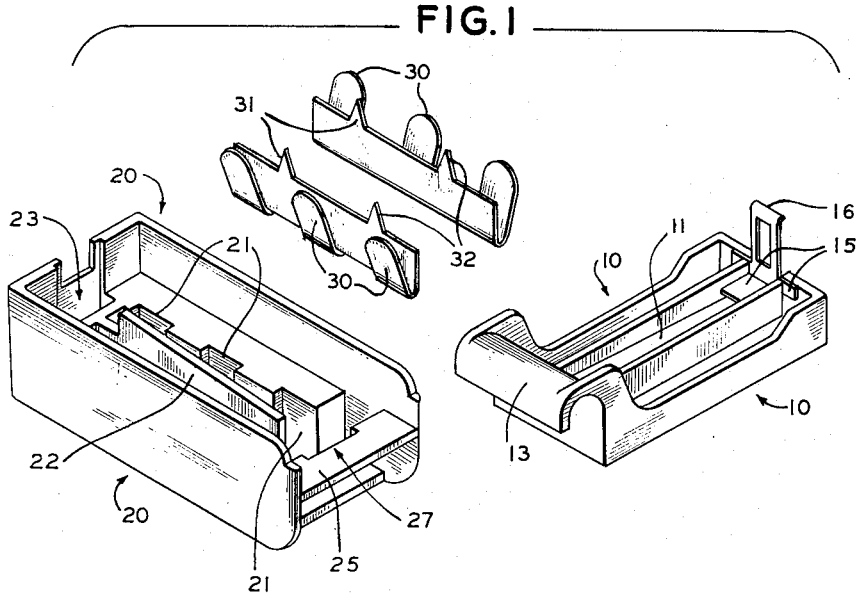
Fig. 1 is a perspective view of the non-conductive molded base and cover (housing members), with their two metal conductive parts, all four thereof being shown in spaced relation and ready for assembly; and the fifth part (a spring latch) is shown fixed in the base. The adjacent ends of the two molded members, at the center of the view, are the hingeable ends.
Figure 2:
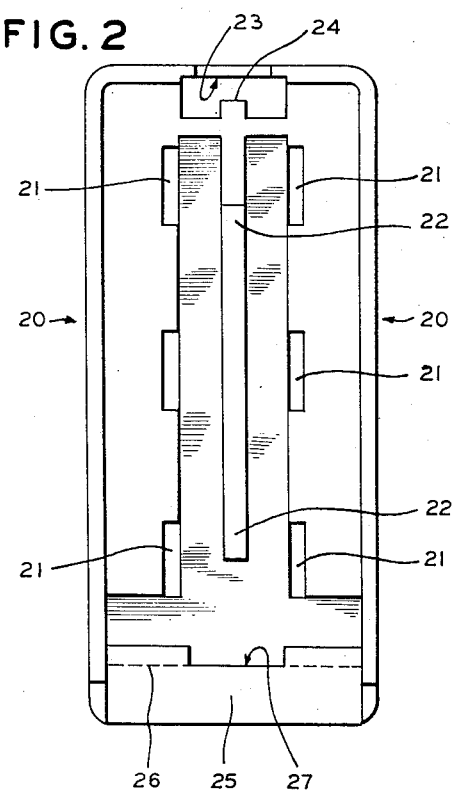
Fig. 2 is a view looking into the open bottom of the cover (inverted from its normal position) showing a center rib separating two channels adapted to hold the two metal conductive parts, and also showing one portion of the hinge means.
Figure 3:
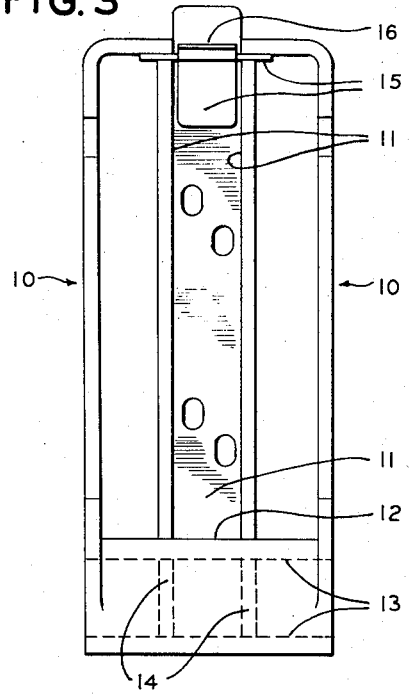
Fig. 3 is a plan view looking down upon the base, showing its conductor-receiving groove, also spring latch, as well as the other portion of its hinge means.

Fig. 2 of the cover and Fig. 3 of the base are placed directly under like views of Fig. 1. The front and wide opening ends are at the upper parts of Figs. 2 and 3, which means that the aforementioned hinge portions are at the lower parts of these two views.

Fig. 4 is a fragmentary lengthwise sectional view of the base and cover, in the act of being assembled, preliminary to mounting the pair of conductive parts in position, by which to complete the hinge means. This view may be regarded as being taken at the right of the section plane 6 of Fig. 7 and omits some of the parts.

Fig. 5 is a lengthwise sectional view of the completely assembled receptacle, developed along the section plane 6, and pivoted to wide open position, ready to receive an electrical conductor (as shown) into the open end of the base at the right-hand side of the view. Thus, the hinge means is fully open to demonstrate its unique principle, which is one of the simplifying features in manufacture. This view is to be compared with Fig. 4 for understanding the action of the metallic parts which hold the hinge means in assembled relation and is a function distinct from that of also being electrically conductive.

Fig. 6 also is a lengthwise section of the receptacle but pivoted to fully closed position (with the conductor in place and shown in side elevation), the spring latch releasably engaging a lug, thus providing a detent latching means. This view is developed along the section plane 6 of Fig. 7.

Fig. 7 is a transverse section along the plane 7 of Fig. 6 and, among other things, shows the two electrical-connecting barbs pierced through the two-wire cord conductor.

This new receptacle is for use with an ordinary flat insulation-covered parallel two-wire cord conductor marked W on the drawings. It is a flexible wire in general use for circuit leads to portable or mobile electrical appliances and comprises standard cord conductor known to the art. The invention fills a need for an outlet receptacle which may be attached to that type of conductor, by a simple and automatic installation, without skinning or deinsulating the wiring cord W, also without the use of a tool, and by one inexperienced in appliance wiring installations.

In coming to a description of one preferred example of the invention, it is pointed out that the electrical outlet receptacle here shown is of the multiple type for receiving three cord plugs—sometimes called a triple outlet. More particularly, the present receptacle is adapted to receive its several cord plugs on one side, that is, in tandem or in line with each other. This selected illustrated example of the invention calls for an elongated or slender form of housing, as shown herein, for enclosing the conductive or metallic parts as well as the cord conductor W or the end thereof. It will be seen that the scope of the invention admits of other equivalent housing types and shapes which also may be regarded as equally well preferred in implementing the invention.

The drawings show a molded base member 10, and the reference numbers used in describing it are in the "teen" series. Note that this base is of rectangular and elongated shape, being comparatively thin and generally flat. For the purpose of this disclosure, the base 10 may be regarded as having a horizontal position, as in Sheet 2 of the drawings.

An elongated conductor-receiving recess or groove 11 extends centrally from front end to rear end of the base. This is a three-sided groove having an open upper side and is dimensioned cross-sectionally in width to receive and make a closely held fit with the flat two-wire conductor W. The close-fit groove 11 is inclined upwardly (at approximately the angle shown), in relation to its horizontal base, from a low position at its outer front open end (at the right in the drawings), to a high position at the rear closed end thereof. The rear end of the base and of its groove are closed by a vertical end wall portion 12 rising above the plane of the base.

Next, it is pointed out that the rear end 12 of the base 10 is molded in the form of a ring segment to provide an arcuate bearing lip 13 or half-bearing, the axis of which is somewhat above the high rear end of the upwardly inclined close-fit conductor-receiving groove 11. This arcuate lip 13 constitutes an upward continuation of the rear end wall 12 of the horizontal base.

A bearing web 14 is molded within the arcuate half-bearing lip 13, say centrally of its width, and joins the rear wall 12 of the base. In fact, it is preferred to provide two spaced parallel webs 14 spanning the inside diameter of the bearing lip, and they are transverse to its axis. The lower rear edge of the web or webs is rounded concentric with the axis of the bearing lip. These two elements 13 and 14 may be regarded as one portion of a hinge means later described.

A one-piece metallic cross bar and tongue device 15 is fixed in horizontal position at the front end of the base 10, over the open end of the three-sided conductor-receiving groove 11 and across it. This tongued-cross bar 15 acts as a partial top closure to define an entry opening at and for the front end of the close-fit groove 11. Thus, the cross bar and its tongue centered thereunder provide a guide for piloting or starting (and holding in place) the extremity of the flat conductor W when inserting it into the molded groove of the base 10, as in Fig. 6.

A spring latch 16 is made integral with the cross bar and tongue 15. This spring latch extends upward from the mid-portion of the cross bar; and the upper portion of the latch is adapted to resiliently yield or flex relatively to the cross bar rigidly fixed in the base across the groove 11. Thus the latch is perpendicular to the plane of the base 10. Note also that the latch has a central perforation for spring-snap and releasable- fastening engagement with a latching lug on the cover, next described.

Incidentally, the base 10 may be molded with a pair of screw-holes (not shown) through its bottom for the purpose of fastening the receptacle in any convenient position on a wall or furniture piece. This expedient converts the mobile receptacle to a stationary one when installing it in service position on the wire W.

A molded cover member 20 has several portions referred to by reference numbers in the "twenty" series. It is of hollow form and also is rectangular cross sectionally in its elongated shape to match the molded base 10 and embrace it. The cover has a flat top, with smooth imperforate parallel sides of deep formation, and is open at its bottom to make a close fit down upon and over the base when pivoted into fully closed position thereon.

The top of the cover 20 is provided with one or more pairs of conventional blade-entry apertures 21 in tandem adapted to receive, in the usual way, the contact blades of an ordinary two-wire cord plug terminal (not shown). In other words, this example of the invention adapts several cord plug terminals to a plug-in blade-fit on one side only (such as its top side), as distinguished from another structural example or modification having one pair of blade apertures 21 formed in each of its several sides. As known in the art, the parallel contact blades of any cord plug are thrust through the apertures 21 of this or any other outlet receptacle (through one or more sides thereof) for quick-connect and disconnect contact with the electrically conductive parts (spring contact fingers) on the inside of the outlet housing.

A rib 22 is molded within the cover 20 and extends centrally thereof toward both ends. Accordingly, the straight edge of the rib becomes centrally aligned with and positioned over or in the mid-portion of the open side of the inclined conductor-receiving groove 11 in the molded base 10 after the cover is swung down to fully closed position. In effect, therefore, the rib 22 constitutes in part the fourth side of the three-sided groove to align and flatten out the conductor W therein.

This center rib 22 (its edge) is also inclined from one end to the other to conform with and make the same angular incline as the groove 11 in the base. Thus, the front end of the rib is wider than its rear end so as to parallel the mid-lengthwise inclined axis of the groove. The rib also divides the hollow interior of the cover 20 into a pair of parallel channels, one on each side of the rib, for holding the metal inserts (electrical conductive parts), as hereinafter described.

A throughway passage 23 (open at both ends) is molded in the front end of the cover, perpendicular to its lengthwise axis, for the purpose of receiving and enclosing the spring latch 16 of the base 10. A latching lug 24 is molded in this passage 23, with a catch-shoulder at the upper end of the passage, for releasable latching engagement with the perforated spring latch 16 to lock the front end of the swingable cover 20 down on the base 10.

An axial bearing or journal pin 25 of unique form is molded transversely of the long axis of the cover 20 at its rear end. In cross section, this journal is quadrant-shaped on its rear surface and has its axis coincident with that of the arcuate bearing lip 13. Also, a guide bearing slot 26 is molded adjacent and parallel to the quadrant-shaped bearing pin. In addition, a bearing notch 27 is molded in the mid-portion of the bearing pin 25, thus removing a portion of the quadrant bearing surface from said mid-portion, while leaving a portion thereof at each end of the pin.

As later described with reference to the completed assembly, the bearing pin, its adjacent bearing slot, as well as its bearing notch—these three cooperating elements 25, 26 and 27—constitute a unique operating portion of a pivotal axis on the cover 20 by which permanently to hinge-assemble it onto the base 10, doing so without the necessity of adding parts to make the hinge means.

The two molded housing members (base 10 and cover 20) are hingedly assembled by inserting (see Fig. 4) the free end edge of the arcuate bearing lip 13 of the base into and through the bearing slot 26 of the cover. The bearing web or webs 14 are thus confined within the notch 27, with a swinging and guided fit therein, against the bearing pin 25 and concentric with its axis. In this way, the curved lip 13 is set into position upon the axial bearing pin 25 and pivotally guided by the slot.

However, it is noted (Fig. 4) that the lip 13 will as readily slip out of its guide slot 26 as it was inserted therein. But the electrical conductive parts next described (see Fig. 5) complete the unique hinge means, hold it together for service operation, and prevent the housing members 10 and 20 from coming apart when pivoted relatively to each other. It is seen that this arrangement—involving the monolithic construction of the elements 13, 14, 25, 26 and 27—reduces the number of parts and the time required to assemble them.

Next, there is a pair of electrical conductive parts (metallic inserts) mounted in the swingable cover 20, and they are duplicate or twin parts. Each conductive part has a resilient or spring contact finger or fingers 30 of known form, as well as a rigid insulation-piercing barb or barbs 31 which function in an improved way. Each conductive part has a pressed fit and is held within its respective channel, adjacent each side of the rib 22. The contacts 30 are aligned with the respective apertures 21; and the barbs 31 are positioned to pierce and electrically connect with the respective wires of the cord conductor W held in the groove 11. Thus, the divider rib 22 separates and insulates the pairs of contact fingers 30 and the pairs of barbs 31. Likewise, the rib braces the barb pair 31 and directs their piercing points into the conductor.

Further as to the hinge means—it is seen that the rear ends of the pair of conductive parts, held in parallel relation within the cover 20, are disposed contiguously (see Figs. 5 and 6) with the segmental perimeter of the arcuate bearing lip 13 of the base 10. It is this contiguous-bearing fit which guides or maintains the lip captive and swingable within its bearing slot 26 and concentrically upon its quadrant-shaped bearing pin 25. After the two metallic parts are inserted into the cover (compare Fig. 4 with Figs. 5 and 6), it follows that the lip 13 is captive upon its journal 25. Thus, the hinge means is completed and maintained in swingable operation. In this way, the two housing members with the two conductive parts constitute a concealed, built-in and self-assembled hinge means, the four parts being characterized by these additional functions which aid manufacture and appearance.

In the drawings and from the foregoing, it is seen that the electrical-connecting barb pair 31 is located adjacent the novel hinge means, and that the swingable base 10 and cover 20 have a greater overall pivotal length than the distance between said barbs and the hinge axis. This arrangement provides a substantial leverage, when closing the cover down over the base, and thus little manual effort (thumb and forefinger pressure) is required for obtaining deep penetration of the two barbs 31 into and through the conductor W. It is the upward rear incline of the groove 11 in the base 10 which provides this full depth penetration (a good and permanent electrical connection) by reason of the fact that the rear end of the groove 11 supports the conductor close to the barbs 31.

Attention is next drawn to a pair of strain-relief barbs 32 shown to be of the same length and rigid form as as first barb pair 31. This additional or second barb pair 32 (also integral with the conductive parts) is located remote from the hinge means and, therefore, achieves only partial penetration of the conductor W. The second pair does not have or require the large degree of leverage or the mechanical piercing advantage of the electrical connecting barbs 31. It is the downward incline of the groove 11 (toward its front end) which provides this partial snubbing penetration of the barbs 32 into the conductor and hence a strain-relief grip thereon. This follows because the outer or front end of the groove 11 supports the conductor slightly further from the barbs 32 than is true of the rear end of the conductor in its closer supported relation to the barbs.

The two pairs of insultion-piercing barbs 31 and 32 are shown as having the same length points, but it is noted that the front barbs (strain-relief) 32 extend a shorter distance below the straight edge of the separator rib 22 than is true of the rear (electrical-connecting) barbs 31. This arrangement is due to the fact that the front portion of the rib 22 is wider than the rear and, therefore, a large portion of each barb shank 32 rests against the side surface of the rib. Only the tip of the front barbs 32 is exposed below the edge of the rib 22, whereas the greater portion of the rear barbs 31 is exposed below it. Thus, the varying width of the rib 22 in effect makes the rear barbs 31 long and the front barbs 32 short.

An understanding of the foregoing will demonstrate that the running edge of the center dividing rib 22 may be said to constitute a depth gauge to control or measure penetration depth of the two pairs of barbs 31 and 32 into the cord conductor W. Since the rib has the same angular incline as the wire groove 11 (and hence the wire W therein), and since also the rib edge swings down into contiguous relation (light engagement) with the surface of the wire, it follows that the two pairs of barbs 31 and 32 penetrate the wire in respective depths as permitted and gauged by the rib. Such feature provides a deep and levered penetration (electrical-connection) of the barb pair 31 at the hinge and a shallow penetration (strain-relief grip) of the barb pair 32 where the leverage is less.

It has been pointed out that each conductive or metallic part is a duplicate of the other, that is, made from the same forming die. And now it is further explained that one barb is closer to one end of a given part than to the other end thereof. Consequently, when two of these duplicate parts are reverse-ended and fixedly assembled in the cover—with the two barbs of each part at rest against the opposite sides of the dividing rib 22—it follows that the two rear barbs 31 are staggered, that is, one barb is slightly forward of the other. This arrangement possesses the advantage of longitudinal as well as transverse (dual) spacing of the electrical-connecting rear barb pair 31 and increases the spacing or air-gap insulation between them.

And the same dual spacing is true for the front barb pair 32 which bites into the insulation of the conductor W, also at longitudinally spaced points, to achieve a snubbing grip by spacing the two biting forces from each other along the rib 22, thereby minimizing the tendency to tear or slit the conductor insulation in the event an abnormally heavy pull is applied to it. Accordingly, only one type of metallic insert 31, 32 need be produced; two of which are used, the pair being reverse-ended into the cover and against its rib 22, whereupon both barb pairs 31 and 32 stagger themselves longitudinally of the rib to attain the foregoing advantages.

In use, the enclosed spring latch 16 is released (pressed outward) at its top from the lug 24, whereupon the cover 20 and base 10 are swung apart to open the receptacle. Then the extremity of the conductor W is inserted into the open end of its close-fit receiving groove 11, by starting under the cross-bar guiding tongue 14, and pushing all the way back to the stop 12 at the rear of the base. The cross-bar and tongue means 15 serves to retain the wire W down and in place while handling it when closing the cover.

Next, the cover 20 is clampingly closed down upon the base 10 until the latch 16 snaps over its lug 24 enclosed within the throughway passage 23. Upon closing the receptacle, it is seen that the rib 22 in effect serves as a fourth side for the open-top, three-sided groove 11, in that the straight edge of said rib swings down onto the exposed upper surface of the conductor (without applying undue pressure thereagainst) and insures that it flattens out straight within the groove simultaneously with the penetrating action of the barb pairs 31 and 32.

Thereupon, the rear barbs 31 pierce deeply and through the conductor and its wire strands—held in straight-jacketed place by the rib 22—and thus make a permanent electrical connection. Likewise, the front barbs 32 make slight penetration to establish a strain-relief grip for taking up any strain on the conductor in the event it is subjected to pulls and jerks incident to the wear and tear of general use.

The snubbing and strain-relief grip of the receptacle on the conductor may be increased by serrating the bottom surface of the groove 11 or by forming a socket in it under and aligned with the points of the several barbs 30 and 31. Note that this additional conductor-clamping means is shown in the drawings, where the pressure of the barb points piercing one side of the conductor tends to squeeze the other side of its insulation covering into the respective sockets.

It is significant that the detent latching means 16, 24 not only is enclosed within the throughway passage 23 at one end of the receptacle but is also protected against accidental release; and it is of equal importance that the receptacle members constitute their self-enclosed hinge means at the other end. Taken all together, these features are contrived in combination to enhance appearance, reduce the number of parts, and minimize production cost.

This disclosure explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

The invention is presented to fill a need for a new and useful electrical outlet receptacle. Various modifications in construction, mode of operation, use and method, may and often do occur to others, especially so after acquaintance with an invention. Accordingly, it is to be understood that this disclosure is exemplary of the principles herein and embraces equivalent constructions.

What is claimed is:

1. An electrical outlet receptacle for use with quick-connect and disconnect contact blades of a conventional cord plug comprising, in combination, two molded members; one of which is a base, having a conductor-receiving groove, dimensioned in cross-section for a close-fit with a flat parallel two-wire conductor adapted to supply current to said receptacle, said groove being open at one end to receive the conductor, and closed at its other end to form a stop, against which seats the extremity of the conductor; the other molded member of which is a cover for closing the base, and said cover having apertures through which the contact blades of the aforesaid cord plug are adapted to be thrust; a pair of conductive parts fixed in the cover, each having a resilient contact finger in alignment with a said aperture, for engagement with a said contact blade, and each conductive part also having a rigid barb, in a position to pierce a respective wire of the conductor, to make a permanent electrical connection therewith, when the cover is fully closed upon the base; a hinge means, pivotally connecting the cover on the base, adjacent the closed end of said groove, and including trunnion means concealed when the cover is closed on the base; and detent latching means, enclosed by the cover, and engageable with detent means carried by the base, to lock the cover and base together in fully closed position.

2. An electrical outlet receptacle, as covered in claim 1; and wherein the conductor-receiving close-fit groove is of three-sided cross-sectional form; and also a straight-edge rib is carried within the cover, in alignment with the groove, constituting a fourth side for said groove, and swings down upon and flattens the conductor therein, when the cover is fully closed.

3. An electrical outlet receptacle, as covered in claim 1; and wherein the conductor-receiving close-fit groove is of three-sided cross-sectional form; and also a straight-edge rib is carried within the cover, in alignment with the groove; and wherein the rigid barbs are mounted against opposite sides of the rib, the barbs projecting beyond the straight-edge thereof; and said rib acting to direct the barbs in their piercing action into the conductor, and also to gauge the depth of said piercing action, when the cover is fully closed.

4. An electrical outlet receptacle, as covered in claim 1; and wherein the detent latching means includes a spring latch, one end of which is fixed on the base, astride the open end of the groove, thus providing an entry guide for piloting the extremity of the conductor when it is inserted in said groove and pushed therealong to the stop, and also including a lug over which the spring latch engages to hold the cover in said closed position.

5. An electrical outlet receptacle, as covered in claim 1; and wherein the detent latching means includes a cross bar fixed on the base, astride the open end of the groove, thus providing an entry opening for guiding the extremity of the conductor when it is inserted into said groove and pushed therealong to the stop, together with a perforated spring latch integral with and upstanding from the cross bar and being sufficiently long to reach to the upper portion of the cover; and wherein the detent latching means also includes a lug, which is formed on the cover, near the upper portion thereof, and said lug being enclosed within a throughway passage, which is open at both ends and which is provided in said cover; and into which passage the perforated spring latch extends and is enclosed when engaging said lug, for holding the cover in its fully closed position, and the outer end of the latch being accessible, in said passage at the upper portion of the cover, for releasing said latch from the lug, to pivotally open the receptacle.

6. An electrical outlet receptacle, as covered in claim 1; wherein the pair of rigid barbs in the cover is adjacent the hinge means, and the conductor-receiving groove in the base is inclined upwardly, from a low position at the open end of said groove to a high position adjacent the hinge means, thus providing deep penetration of said barbs into the conductor, for making permanent electrical connection therewith; and wherein another pair of rigid barbs, each on a conductive part, is located remotely from the hinge means, further down the inclined groove at its low position, for partial penetration of the conductor, and thus providing a strain-relief grip thereon.

7. An electrical outlet receptacle, as covered in claim 1; wherein the concealed hinge means comprises an arcuate bearing lip, an axial bearing pin therefor, and a bearing slot formed parallel and adjacent the bearing pin, all three of which are integrally formed with the molded receptacle members; and in which slot the bearing lip is swingably guided concentrically with the bearing pin; and at least one of the conductive parts being fixed contiguously to the arcuate bearing lip, in swingable relation therewith, for confining said lip within its bearing slot and upon its bearing pin.

8. An electrical outlet receptacle, as covered in claim 7; wherein the axial bearing pin is provided with a notch, and a bearing web means is formed on the inside of the arcuate bearing lip, said web means having a swingable fit within the notch and against the axial bearing pin, thus comprising six coacting elements integrally formed with the molded members.

9. An electrical outlet receptacle comprising, in combination; a molded base, having a conductor-receiving groove dimensioned in cross-section for a close-fit with a flat parallel two-wire conductor; a tongue astride and overlying the groove for guiding the end of the conductor thereinto; and a cover over the base, hinge means pivotally attaching the cover onto the base, a rib formed within the cover, and also extending along the center of the groove; a pair of conductive parts, having contact fingers mounted on each side of the rib, each contact finger being in alignment with an aperture formed in the cover and through which aperture a contact blade of a conventional cord plug is adapted to be thrust for disconnect engagement with a said contact finger; a barb integral with each conductive part, the barbs being separated by the rib, and in a position to pierce the conductor and penetrate the respective wires thereof when the cover is pivotally closed onto the base; and a lug with spring latch on the receptacle to lock the cover down onto the base.

10. An electrical outlet receptacle, as covered in claim 9; wherein the two conductive parts of identical form, with at least a second barb on each part, thus providing at least two pairs of barbs, one barb being located nearer the end of its conductive part than the other barb is located in respect to the opposite end of the same conductive part; and one of the conductive parts being reverse-ended in relation to the other, when both are mounted on each side of the rib, thus staggering the barbs of each pair along the rib, one barb ahead of the other.

11. An electrical outlet receptacle for use with quick-contact and disconnect contact blades of a conventional cord plug comprising, in combination, two molded members; one of which is a base, having a conductor-receiving groove, dimensioned in cross-section for a close-fit with a flat parallel two-wire conductor, said groove being open at one end to receive the conductor, and closed at its other end to form an end-stop therefor; the other molded member of which is a cover for closing the base, and said cover having apertures through which the contact blades of the aforesaid cord plug are adapted to be thrust; a pair of conductive parts fixed in the cover, each having a resilient contact finger in alignment with a said aperture, and each also having a rigid barb in position to pierce and connect with a respective wire of the conductor, when the cover is closed down upon the base; a hinge means, cooperating with the cover on the base, for compressing and piercing the respective wires of the conductor onto the respective rigid barbs; and a locking means, cooperating with said hinge means, for maintaining the conductor compressed in pierced position on said rigid barbs.

References Cited in the file of this patent
UNITED STATES PATENTS

| | | |
|---|---|---|
| 2,162,545 | Benander et al. | June 13, 1939 |
| 2,173,705 | Benander | Sept. 19, 1939 |
| 2,408,045 | Cottrell | Sept. 24, 1946 |
| 2,590,886 | Pedersen | Apr. 1, 1952 |